Patented Oct. 30, 1945

2,388,074

UNITED STATES PATENT OFFICE 2,388,074

LUBRICANTS

John A. Patterson and Rush F. McCleary, Beacon, N. Y., assignors to The Texas Company, New York, N. Y., a corporation of Delaware No Drawing. Application April 22, 1942, Serial No. 440,098

11 Claims. (Cl. 252—35)

This invention relates to the use of metal derivatives of compositions obtained or derived from the Anacardium genus of the Anacardiaceae family in hydrocarbon oils, particularly petroleum oils, to improve the properties of the lubricants compounded therewith.

The additive ingredients of the present invention are prepared from the extracted oils obtained from the Anacardium genus of the Anacardiaceae family and include the compositions and constituents of such oils as cashew nut shell oil, marking nut shell oil, Japanese lac, etc. It is the consensus of the authorities on these extracted oils that the chemical compositions thereof consist primarily of various types of aromatic derivatives such as anacardic acid ($C_{22}H_{32}O_3$), cardol ($C_{32}H_{52}O_4$), cardanol ($C_{20}H_{32}O$), anacardol ($C_{18}H_{30}O$) and urushiol ($C_{20}H_{30}O_2$).

It has been discovered that the addition of small quantities of an oil-soluble or oil-miscible metal derivative of the oil-soluble phenolic compositions contained in, or derived from the Anacardium genus of the Anacardiaceae family to a refined hydrocarbon oil provides a lubricant or a compounding lubricant which possesses improved resistance to sludge, varnish and lacquer formation in operation.

The phenolic compositions to which this invention applies are those oil-soluble phenols which exist in the naturally occurring Anacardium oils or are formed by the decomposition of other aromatic derivatives present in the oils. These oil-soluble phenols are usually mono- or di-hydric phenols possessing long chain unsaturated alkyl groups attached to the nucleus.

The naturally occurring cashew nut shell oil is described as containing approximately 90% anacardic acid and 10% cardol. Neither of these constituents are applicable to the present invention in that anacardic acid fraction contains a carboxyl group and the cardol fraction, while described as a phenolic composition, is relatively oil-insoluble.

The commercially available cashew nut shell oil which is obtained by a thermal extraction process consists primarily of a mixture of anacardic acid, cardanol and cardol with cardanol predominating. The cardanol fraction which does not appear in the natural occurring oil is presumed to be a degradation product of anacardic acid and the amounts of cardanol present in the commercial oil depends upon the degree of heat used in the extraction process. Cardanol is an oil-soluble phenolic composition which is described as possessing an unsaturated alkyl radical of 14 carbon atoms in the meta position. For the purposes of the present invention, this phenolic composition may be obtained from the extracted oil by the following methods: (1) distillation of the commercial cashew nut shell oil at greatly reduced pressure; (2) steam distillation of the commercial cashew nut shell oil at atmospheric or reduced pressure; (3) destructive distillation of the solvent extracted cashew nut shell oil; or (4) decarboxylation of the solvent extracted cashew nut shell oil with subsequent distillation or solvent extraction.

Upon distillation of the commercial cashew nut shell oil, an oil-soluble distillate is obtained which consists almost entirely of cardanol. The cardanol distills over as an oil-soluble, light-colored liquid at approximately 225° C. and 10 mm. Hg. This compound is very unstable and upon heating forms condensation and polymerization products together with co-polymers.

In addition to the cardanol, the distillate obtained contains a lower boiling fraction possessing a nicotine-like odor which rapidly darkens when exposed to the atmosphere. This fraction, which amounts to about 5% of the original oil contains approximately 0.64% nitrogen. If desired, this lower boiling fraction may be removed by fractional distillation.

The following physical constants were obtained on two distillates of the commercially available thermal extracted cashew nut shell oil, one being obtained by vacuum distillation at 10 mm. mercury (A), and the other by steam distillation at atmospheric pressure (B).

| | A | B |
|---|---|---|
| Bromine No. | 135 | 118 |
| Hydroxyl No. | 183 | 181 |
| Neutralization No. | 6 | 3.5 |
| Saponification No. | | 8.4 |
| Percent sulfur | 0.10 | 0.10 |

The oil-soluble or oil-miscible metal derivatives of these oil-soluble phenolic compositions may be incorporated in any refined hydrocarbon oil which is normally subject to oxidation conditions during service. Among these hydrocarbon oils which may be improved are the petroleum lubricating oils such as motor, Diesel, turbine and aviation oils, and the refined hydrocarbon oils used in the preparation of industrial lubricants, greases, textile oils, etc.

The particular metals which may be used to form the metal derivatives of the present invention include any of the following metals: sodium, potassium, lithium, calcium, barium, strontium, tin, bismuth, aluminum, zinc, magnesium, cadmium, lead, titanium, antimony, chromium, manganese, iron, cobalt, nickel and copper, with preference given to the alkaline earth metals and tin and zinc.

These oil-soluble phenolic compositions of the present invention are very susceptible to polymerization and condensation reactions which result in oil-insoluble products whose metal derivatives are also oil-insoluble. It has been found that by partially hydrogenating the unsaturated alkyl radicals, these undesirable reactions are avoided and the partially hydrogenated product is sufficiently stable to proceed with the formation of the metal derivatives thereof. These hydrogenation reactions do not completely hydrogenate the unsaturated alkyl radical and a certain degree of unsaturation is left which may be utilized in further improving the product by the incorporation of various radicals containing such inorganic constituents as sulfur, halogen, nitrogen and phosphorus.

One method of preparing the metal derivatives which simultaneously includes the partial hydrogenation of the oil-soluble phenolic composition is the reaction of a solution of the desired metal in liquid ammonia with the phenol. This reaction results in a partial hydrogenation of the unsaturated constituents by means of the residual hydrogen displaced by the metal.

Other reactions may be used which, due to the low temperatures of operation, do not require a stabilization step in order to avoid the polymerization reactions of the phenolic compositions. Such a method is a reaction of the solution of a metal salt such as the halide in liquid ammonia with the oil-soluble phenolic composition.

The invention is not limited to these particular methods of preparing the metal derivatives and any other classical method may be used which will result in the formation of oil-soluble or oil-miscible metal derivatives.

It is to be understood that the term "metal derivative of the oil-soluble phenolic compositions derived from a member of the Anacardium genus of the Anacardiaceae family" as appearing throughout the specification and claims, unless otherwise stated, includes the metal derivatives, that is the partially or completely neutralized hydroxyl groups of the oil-soluble phenols contained in or derived from the Anacardium genus of the Anacardiaceae family and including cashew nut shell oil, marking nut shell oil, Japanese lac, etc., together with the hydrogenated derivatives and/or further derivatives thereof containing sulfur, halogen, nitrogen and phosphorus radicals which have heretofore been known to impart improving qualities.

These oil-soluble metal derivatives of the present invention may be incorporated in a hydrocarbon oil in amounts varying between 0.01 to 5.0% by weight of the finished lubricant. The particular proportions used depend upon the type of lubricant to be improved, the service for which the lubricant is intended, and the degree of improvement desired in the hydrocarbon oil. The preferred range of proportions in a mineral lubricating oil when used in a few of the more common services are as follows:

| | Per cent by weight of finished lubricant |
|---|---|
| Diesel lubricating oil | 0.5 –1.0 |
| Motor lubricating oil | 0.3 –0.6 |
| Heavy duty lubricating oil | 0.5 –2.5 |
| Turbine lubricating oil | 0.01–0.1 |
| Airplane lubricating oil | 0.2 –0.6 |

The following examples are given as illustrations of the various methods of obtaining the oil-soluble phenolic compositions and the preparation of the oil-soluble metal derivatives thereof:

*Example I*

415 grams of cardanol was dissolved in twice its volume of toluene and added to a solution of 50 grams of technical calcium metal in 3 liters of liquid ammonia with vigorous agitation during a period of two hours. After the addition was complete, the ammonia was allowed to boil off and the residual toluene solution was filtered to remove excess calcium and other impurities. The solvent was removed by heating in vacuo and the product converted to a 50% concentrate by dissolving it in an equal weight of lubricating oil. The 50% concentrate analyzed 3.6% calcium had a bromine number of 45.

*Example II*

300 grams of cardanol was dissolved in twice its volume of toluene and added slowly to a solution of 110 grams of anhydrous stannous chloride in 2.5 liters of liquid ammonia with vigorous agitation. After the addition was complete the ammonia was allowed to boil off and the residual toluene solution of the stannous salt of cardanol was filtered and subsequently freed of solvent by heating in vacuo. The resulting tin salt was converted to a 50% concentrate by dissolving it in an equal weight of lubricating oil. This concentrate analyzed 8.6% tin.

Other metal salts may be used in place of the stannous chloride of Example II or a solution of a metal in liquid ammonia may be used if partial hydrogenation is desired as in Example I. However, the phenolic composition may also be subjected to hydrogenation as, for example, with a Raney nickel catalyst under pressure and/or reacted with other constituents to incorporate additional improving properties in the form of sulfur, chlorine, nitrogen and phosphorus containing radicals either prior or subsequent to neutralization with metal.

The hydrocarbon oils to which the oil-soluble metal derivatives of the present invention are added may be either in the crude form or partially or highly refined and may contain other additive ingredients such as dyes, metal soaps, pour depressants, thickeners, V. I. improvers, oiliness agents, extreme pressure agents, sludge dispersers, oxidation inhibitors, and corrosion inhibitors such as sulfurized hydrocarbons, etc.

Obviously many modifications and variations of the invention, as hereinbefore set forth, may be made without departing from the spirit and scope thereof and, therefore, only such limitations should be imposed as are indicated in the appended claims.

We claim:

1. A lubricant comprising a hydrocarbon oil and a small quantity, sufficient to impart oxidation-resistant properties to said oil, of an oil-miscible metal derivative of the oil-soluble phenolic compositions derived from an oil extracted from a member of the Anacardium genus of the Anacardiaceae family.

2. A lubricant comprising a mineral lubricating oil and 0.01–5% by weight of an oil-miscible metal derivative of the oil-soluble phenolic compositions derived from an oil extracted from a member of the Anacardium genus of the Anacardiaceae family.

3. A lubricant comprising a hydrocarbon oil having incorporated therein 0.01–5.0% by weight of an oil-miscible metal derivative of the oil-soluble phenolic compositions derived from an oil extracted from a member of the Anacardium genus of the Anacardiaceae family.

4. A lubricant comprising a hydrocarbon oil and a small quantity, sufficient to impart oxidation-resistant properties to said oil, of an oil-miscible metal derivative of a partially hydrogenated oil-soluble phenolic composition derived from an oil extracted from a member of the Anacardium genus of the Anacardiaceae family.

5. A lubricant comprising a hydrocarbon oil having incorporated therein 0.01 to 5.0% by weight of an oil-miscible metal derivative of a partially hydrogenated oil-soluble phenolic composition derived from an oil extracted from a member of the Anacardium genus of the Anacardiaceae family.

6. A lubricant comprising a hydrocarbon oil and a small quantity, less than 5% by weight, of an oil-soluble metal derivative of cardanol.

7. A lubricant comprising a hydrocarbon oil and a small quantity, less than 5% by weight, of an oil-soluble metal derivative of partially hydrogenated cardanol.

8. A lubricant comprising a mineral lubricating oil having incorporated therein 0.2–2.5% by weight of an oil-soluble metal derivative of cardanol.

9. A lubricant comprising a mineral lubricating oil having incorporated therein 0.2–2.5% by weight of an oil-soluble metal derivative of partially hydrogenated cardanol.

10. A lubricant comprising a hydrocarbon oil having incorporated therein 0.01–5.0% by weight of an oil-soluble metal derivative of a phenolic distillate obtained from the distillation of cashew nut shell oil.

11. A lubricant comprising a hydrocarbon oil having incorporated therein 0.01–5.0% by weight of an oil-soluble metal derivative of a partially hydrogenated phenolic distillate obtained from the distillation of cashew nut shell oil.

JOHN A. PATTERSON.
RUSH F. McCLEARY.